United States Patent [19]
Korsunsky et al.

[11] Patent Number: 5,936,222
[45] Date of Patent: Aug. 10, 1999

[54] SMART CARD READER HAVING PIVOTING CONTACTS

[75] Inventors: Iosif Korsunsky, Harrisburg; Dimitry Grabbe, Middletown, both of Pa.

[73] Assignee: The Whitaker Corporation, Wilmingotn, Del.

[21] Appl. No.: 08/943,882

[22] Filed: Oct. 3, 1997

[51] Int. Cl.$^6$ .................................................. G06K 7/06
[52] U.S. Cl. .......................................... 235/441; 235/475
[58] Field of Search ..................................... 235/441, 475

[56] References Cited

U.S. PATENT DOCUMENTS

| | | |
|---|---|---|
| 4,221,448 | 9/1980 | Logerot et al. . |
| 4,721,348 | 1/1988 | Mouissie . |
| 4,724,310 | 2/1988 | Shimamura et al. . |
| 4,735,578 | 4/1988 | Reichardt et al. . |
| 4,887,188 | 12/1989 | Yoshida et al. . |
| 4,938,716 | 7/1990 | Chabrolle et al. . |
| 4,961,710 | 10/1990 | Komatsu . |
| 5,012,078 | 4/1991 | Pernet . |
| 5,013,255 | 5/1991 | Juret et al. . |
| 5,033,972 | 7/1991 | Komatsu et al. . |
| 5,091,618 | 2/1992 | Takahashi . |
| 5,259,777 | 11/1993 | Schuder et al. . |
| 5,321,247 | 6/1994 | Mroczkowski et al. . |
| 5,330,363 | 7/1994 | Gardner et al. . |
| 5,334,034 | 8/1994 | Reichardt et al. . |
| 5,334,827 | 8/1994 | Bleier et al. . |
| 5,336,877 | 8/1994 | Raab et al. . |
| 5,463,210 | 10/1995 | Imura . |
| 5,653,610 | 8/1997 | Broschard, III . |
| 5,667,397 | 9/1997 | Broschard, III . |
| 5,796,085 | 8/1998 | Bleier ...................................... 235/441 |

FOREIGN PATENT DOCUMENTS

| | | |
|---|---|---|
| 0274684 | 7/1988 | European Pat. Off. . |
| 0 493 473 B1 | 9/1990 | European Pat. Off. . |
| 3235654 A1 | 3/1984 | Germany . |

*Primary Examiner*—Harold I. Pitts
*Attorney, Agent, or Firm*—Salvatore Anastasi

[57] ABSTRACT

A smart card reader 10 is disclosed having a base 12 which is profiled to have a card receiving area 20. Contacts 22,23 are disposed inside a contact receiving 32 of the base and are pivotable about a leg 40. Insertion of a smart card 60 causes the contacts 22,23 to pivot about the pivot point 42 in order to cause contact points 50 to engage contact pads of the smart card 60.

14 Claims, 5 Drawing Sheets

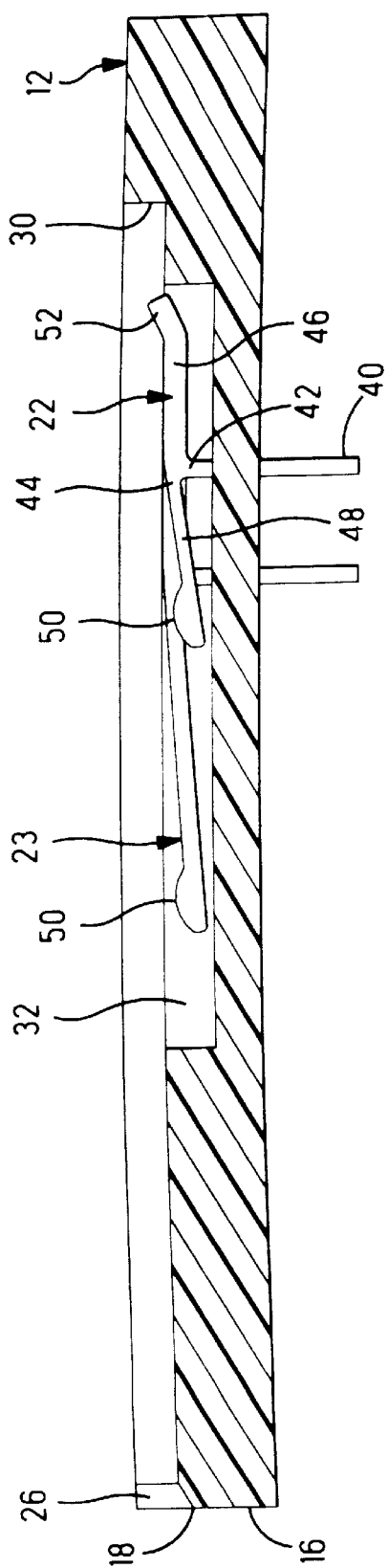
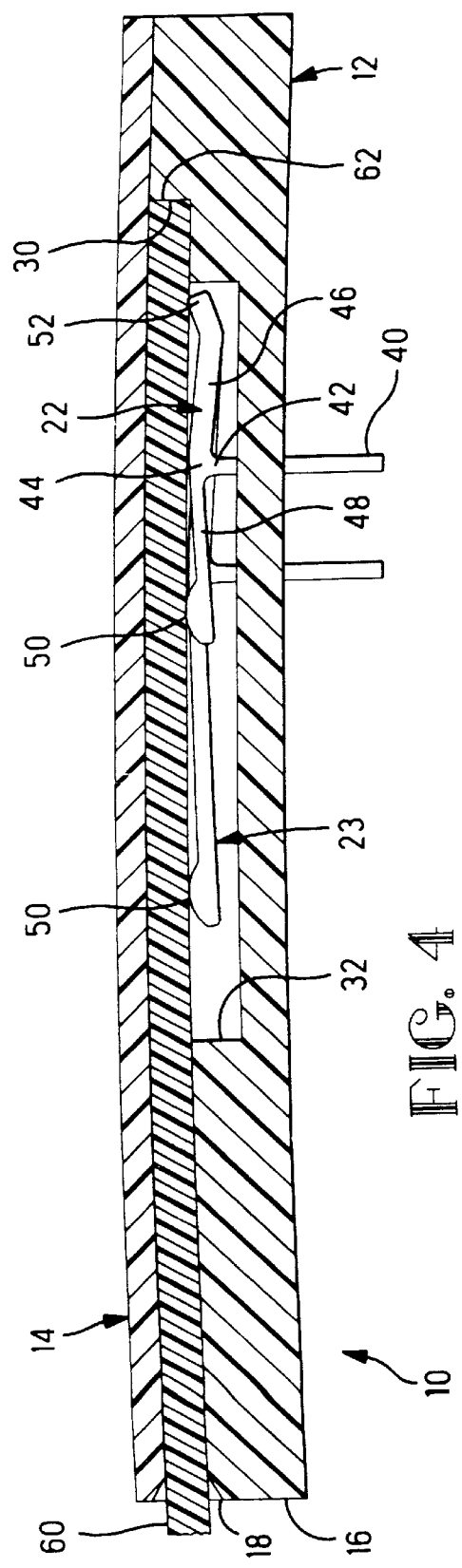

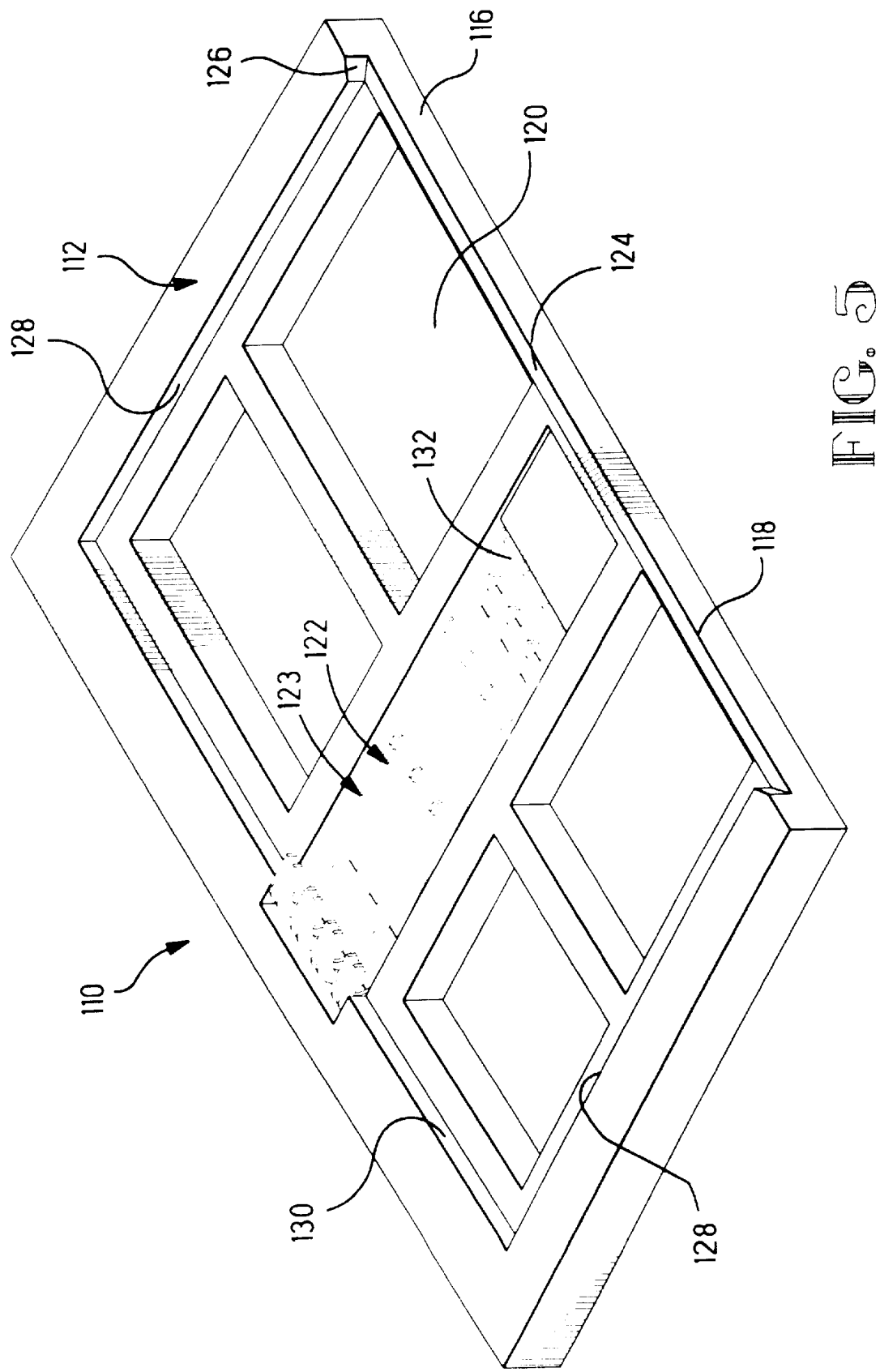

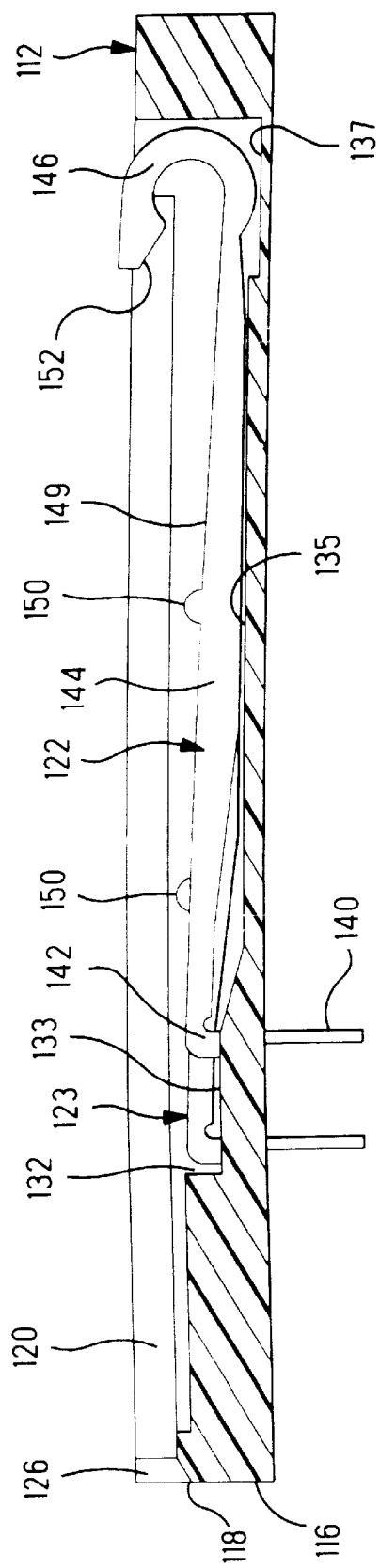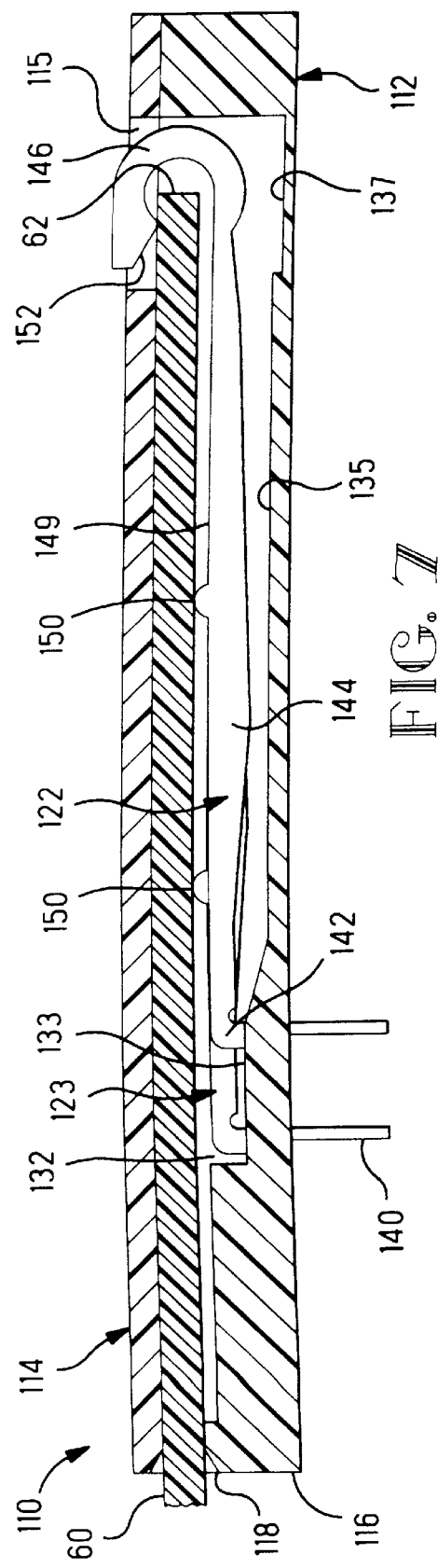

SMART CARD READER HAVING PIVOTING CONTACTS

FIELD OF THE INVENTION

This invention is related to smart card readers and more particularly to an electrical connector which provides a temporary electrical connection between the pads of a smart card and a printed circuit board.

BACKGROUND OF THE INVENTION

Smart cards are well known in the industry as being credit cards having computer chips embedded therein which are connected to metallic contact pads on a major surface of the credit card. These smart cards are insertable into smart card readers which make electrical contact with the pads of the smart card through contacts mounted in the smart card reader housing.

There are currently two types of smart card reader connectors available, sliding type and landing type. One example of the sliding type reader is disclosed in U.S. Pat. No. 5,334,827 by Bleier et al. Bleier et al. show a sliding type reader in which a smart card is inserted into the reader and is slid over the contacts until they are aligned with the pads of the smart card. The contacts are spring loaded against the smart card while the smart card is slid into the read position. A full normal force is exerted against the smart card during the entire mating and unmating cycle to affect a wiping action from the front edge of the card along the major plastic surface and finally on to the contact pads of the smart card.

A problem exists with the sliding-type card readers as disclosed by Bleier et al. in that excess wear occurs on the reader contacts due to a long wiping path at a high normal force during the mating and unmating cycle. As a result, debris is picked up by the reader contacts as they slide along the card surface. This debris is generated by the contacts rubbing along the card surface which may be a plastic or glass filled resin material and then deposited onto the card mating pads making it more difficult to achieve a reliable electrical connection. Another problem exists with such sliding type connectors in that the wiping path along the plastic surface of the card will mar any art work which appears on the surface creating undesirable streaks where the wiping action has occurred. This wiping action also creates dust/debris which is left in the connector in the area of the contacts.

After many mating cycles, this dust/debris settles on the reader contacts and the card mating pads to have a degrading effect on the electrical contact to be established therebetween.

An example of the landing type smart card readers is disclosed in U.S. Pat. No. 4,976,630 by Schuder et al. Schuder et al. teach a smart card reading apparatus including a stationery frame and a contact element support mounted within an opening in the frame for reciprocal movement between a read position and an initial position. Movement of the contact element support into a read position is initiated by pushing the smart card into the reader and return of the support to the initial position is accomplished by a spring which biases the support to the initial position upon removal of the smart card from the reader. Such a design is complex in that it requires the contact support to both translate in the mating direction and move transverse to the mating direction in order to land on the contact pads of the smart card.

A problem exists with these landing type smart card readers in that debris may be picked up by the reader contacts as the smart card surface passes over them. This debris may then be deposited on the smart card mating pads where electrical connection and reliability will be compromised after many mating cycles.

SUMMARY OF THE INVENTION

It is therefore an object of this invention to provide a smart card reader having improved reliability which does not prematurely wear the contacts trough excessive wiping action along the surface of the smart card or create excessive dust or debris during repeated mating and unmating of a smart card with the smart card reader.

The object of the invention has been achieved by providing a smart card reader having a plurality of contacts disposed in a contact receiving area of a base. Each of the contacts has a leg passing through the base for electrical connection with a printed circuit board, and an arm extending from the leg being substantially perpendicular to the leg and pivotable in relation thereto. A contact point is disposed on the arm at a first end towards the mating face and an actuating section is disposed on the arm near a second end opposite the mating face. Upon insertion of a card into the smart card reader, the contact point will not engage the major surface of the card until the card engages the actuating section causing the arm to pivot about the leg to exert a normal force on the contact points sufficient to establish electrical connection with a pad on the card.

BRIEF DESCRIPTION OF THE DRAWINGS

The invention will now be described by way of example with reference to the accompanying figures of FIG. 1 shows a three-dimensional view of the smart card reader according to this invention.

FIG. 3 shows a cross sectional view of the base and contacts of FIG. 2.

FIG. 4 shows a cross sectional view of the smart card reader of FIG. 1 having a smart card inserted therein.

FIG. 5 shows a three-dimensional view similar to FIG. 2 of an alternate base and contact design according to this invention.

FIG. 6 shows a cross sectional view of the base and contacts of FIG. 5.

FIG. 7 shows a cross sectional view similar to FIG. 6 with an addition of a cover and smart card inserted therein.

DETAILED DESCRIPTION OF THE INVENTION

Figure 1:
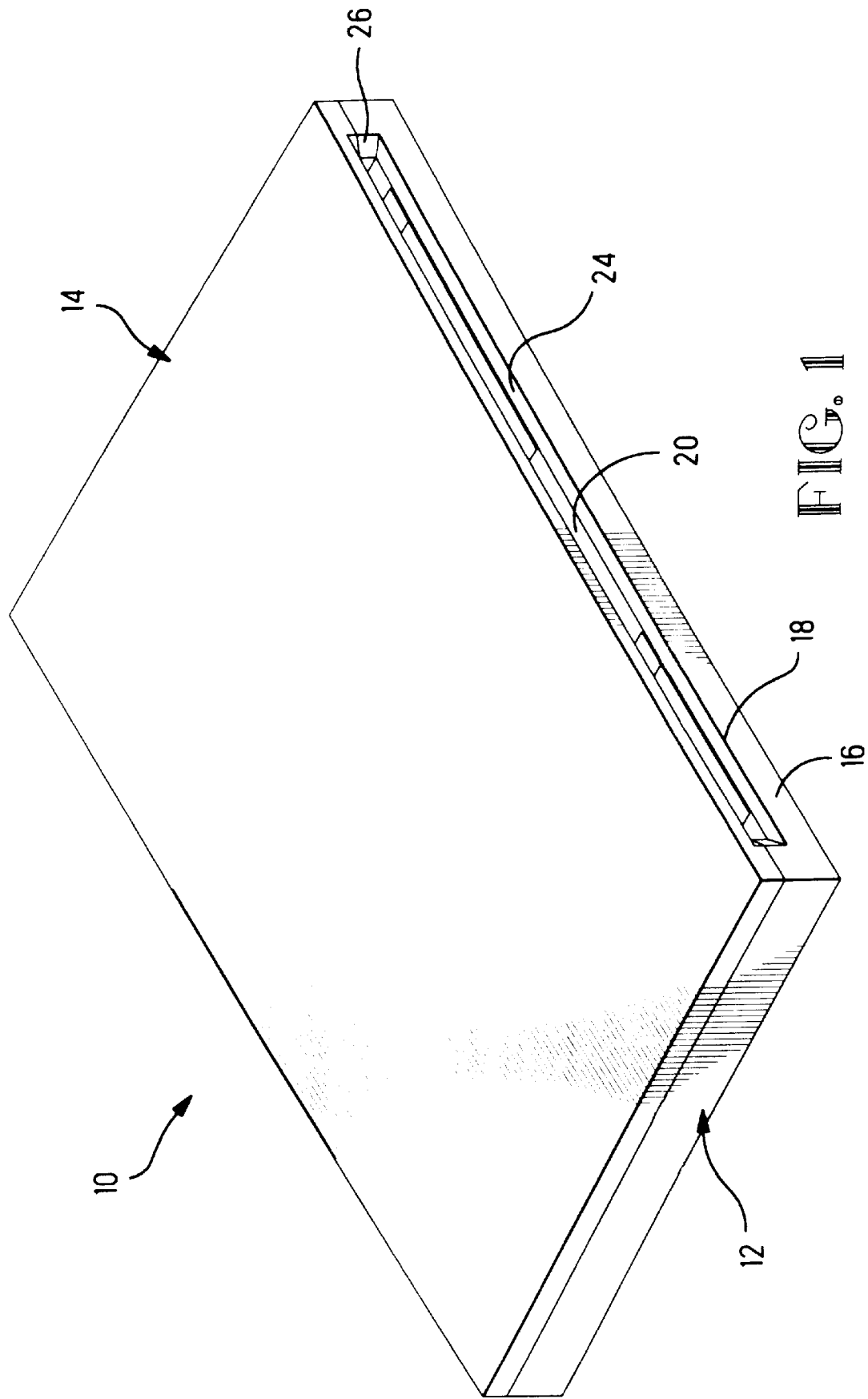

The invention will first be described generally with reference to FIG. 1. A smart card reader 10 is shown in FIG. 1 having an insulative base 12 and a cover 14 mounted thereon. A card insertion opening 18 is provided along the mating face 16 and has standard lead in surfaces 24,26 which open into a card receiving area 20. A plurality of contacts 22 are disposed inside the card-receiving area 20 for temporary electrical connection between the pads of the smart card and a printed circuit board. These contacts 22 will be described in greater detail below.

Figure 2:
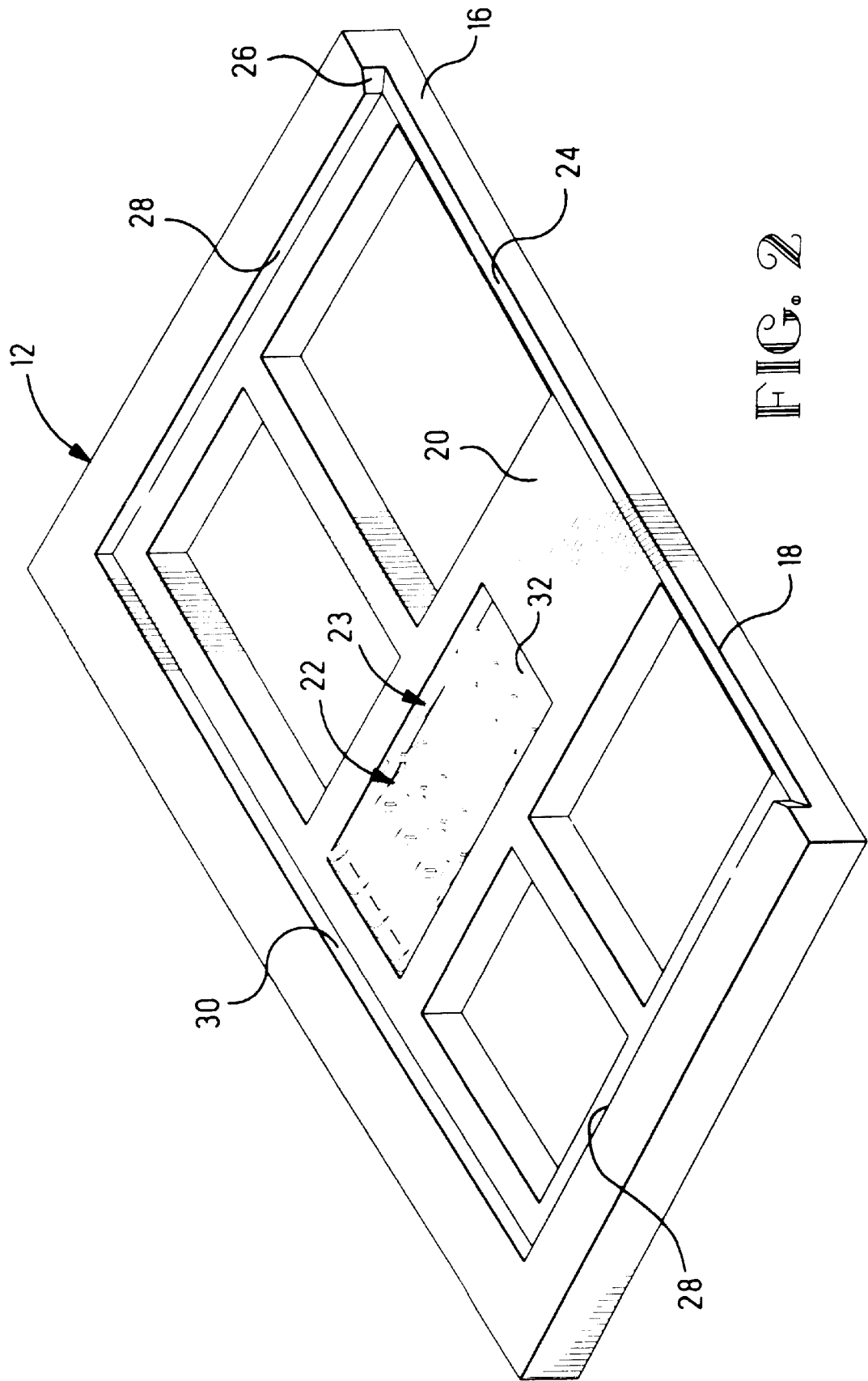
FIG. 2 shows a three-dimensional view of the base and contacts.

Each of the major components will now be described in greater detail with reference to FIGS. 2–4. Referring to FIG. 2, an insulative base 12 is provided for supporting contacts 22,23 of the smart card reader 10. A card insertion opening 18 is provided along the mating face 16 and has standard lead in surfaces 24,26 which extend from the mating face 16 into a card receiving area 20. The card receiving area 20 is dimensioned to receive a smart card between its side walls 28. A stop wall 30 is provided between the side walls 28 to allow the smart card 60 to define a final insertion position. A contact receiving area 32 is defined by a recessed section inside the card receiving area 20. A plurality of contacts 22 are disposed in the contact receiving area 32 and pass through the base 12 for electrical connection to a printed circuit board (not shown).

The contacts 22 will now be described in greater detail with reference to FIG. 3. There are two types of contacts 22,23. The first contact 22 is positioned to make electrical connection with a pad in a first row on the smart card 60. The second contact 23 is positioned to make contact with a pad in a second row on the smart card 60. Both of these contacts 22,23 operate on the same pivoting principle and therefore the description of contact 22 also applies to contact 23. Referring to FIG. 3, the contact 22 has a leg 40 which extends through the base 12 for connection to a printed circuit board (not shown). An arm 44 extends over the leg 40 and has two sections, a contact section 48 and an actuating section 46.

The actuating section 46 of the arm 44 is located on one side of the leg 40 and is substantially perpendicular thereto. This actuating section 46 is dimensioned to be slightly thicker than the leg 40 and the contact section 48. An inclined surface 52 is provided at the end of the actuating section 46 opposite the leg 40. The contact section 48 of the arm 44 is disposed on the opposite side of the leg at an acute angle thereto. A contact point 50 is provided at the end of the contact section 48 opposite the leg 40. The contact point 50 may be selectively gold plated or in the alternative may have a gold dot of material applied thereto by thermo-compression compression bonding or ultrasonic bonding. This would enhance the electrical connection between the contact 22 and a pad of the smart card 60. The arm 44 is pivotable in relation to the leg 40 about a pivot point 42 which is in the area between the contact section 48, the actuating section 46, and the leg 40. As mentioned above, contact 23 substantially similar to contact 22 with the exception having a longer arm 44 for making electrical connection to a pad in the second row on the smart card.

Assembly and operation of the smart card reader 10 will now be described in detail with reference to FIGS. 3 and 4. The contacts 22,23 are simply inserted into the base 12 in the contact receiving area 32 such that their legs 40 are press fit into the base 12. The cover 14 may then be adhesively attached to the base 12 along the side and rear walls 28,30.

The leading edge 62 of a smart card 60 is insertable into the card receiving opening 18 and will pass through the card receiving area 20 without touching either of the contact points 50. Upon further insertion, the leading edge 62 will engage the inclined surface 52 of the actuating section 46. As the smart card 60 is urged farther into the card receiving area 20, the inclined surface 52 will be urged downward as shown in FIG. 4. The arm 44 will therefore pivot about the pivot point 42 such that when the actuating section 46 is urged downward, the contact section 48 will be urged upward toward the smart card 60. This will result in a normal force at the contact point 50 sufficient to establish electrical connection with a pad of the smart card 60 without excessively wiping along the pad.

An alternate embodiment of the smart card reader 110 will now be described in detail with reference to FIGS. 5 to 7. The alternate smart card reader 110 is provided with an insulative base 112 having a similar mating face 116, card insertion opening 118, lead in surfaces 124,126, and card receiving area 120. This base 112 is also similarly dimensioned to receive a smart card edge between its side walls 128. The stop wall 130 extends between the side walls 128 but is discontinuous at the contact receiving opening 132. Contacts 122,123 are disposed in the contact receiving area 132 and extend through the base 112 for connection to a printed circuit board (not shown).

The contact receiving area 132 differs from that of the first embodiment in that it is profiled to receive alternate contacts 122,123. Therefore when viewed from the side (FIG. 6), the contact receiving area 132 has a first depth in a contact leg mounting section 133, a second depth in an arm receiving section 135 and finally a third depth in an actuator receiving section 137.

The alternate contacts 122,123 will now be described in greater detail with reference to FIG. 6. Once again, two types of contacts 122,123 are disposed in the contact receiving area 132. The first contact 122 has similar features to those of the second contact 123, therefore the features will only be described with reference to the first contact 122 as done in the first embodiment. A leg 140 extends through the base 112 in the contact leg mounting section 133. A cantilever arm 144 extends from the leg 140 at an acute angle to the leg 140. A contact point 150 is provided along an upper surface 149 of the cantilever arm 144. The cantilever arm 144 is fixed to the leg 140 at a pivot point 142. A hooked actuating section 146 extends from the cantilever arm 144 at its free end. An inclined surface 152 is provided at the end of the hooked actuating section 146.

Referring to FIG. 7, the cover 114 of this embodiment differs from the cover 14 of FIG. 1 in that an opening 115 is provided therein such that each of the hooked actuating sections 146 have sufficient clearance to pass therethrough.

Assembly of the smart card reader 110 is similar to that of the smart card reader 10 as described above.

Referring to FIG. 7, operation of this smart card reader 110 differs slightly in that the leading edge 62 of a smart card 60 will pass into the card receiving area 120, again without contacting the contact points 150 and will first engage the hooked actuating section 146 along the inclined surface 152. Further insertion of the smart card reader 60 will urge the hooked actuating section 146 through the opening 115 in the cover 114 and the arm 144 will pivot about the point 142 until the contact points 150 exert a sufficient normal force upon the pads of the smart card 60 to establish a reliable electrical connection therebetween without excessive wiping of the pads of the smart card 60. As in the first embodiment, the contact points 150 of this embodiment can also be selectively gold plated or thermo-compression bonded as described above in order to enhance electrical connection to the pads of the smart card 60.

The advantage of this invention is that it provides a smart card reader 10,110 which is capable of many insertion cycles without unduly wearing the pads of the smart card 60 or creating excessive debris inside the smart card reader 10,110.

We claim:

1. A smart card reader having a base being profiled to have a card receiving area, a contact receiving area in communication with the card receiving area, and a plurality of contacts disposed in the contact receiving area, each of the contacts having a leg passing through the base for electrical connection with a printed circuit board, each contact being characterized by:

an arm extending from the leg and being pivotable in relation to the leg, a contact point disposed on the arm at an end toward the mating face and an actuating section disposed on the arm at an end opposite the contact point.

2. The smart card reader as recited in claim 1 wherein the contact point is plated with at least one of the following metals selected from the class: palladium, nickel, and gold.

3. The smart card reader as recited in claim 1 wherein the contact point further comprises a gold material deposited thereon by thermo-compression bonding.

4. The smart card reader as recited in claim 1 wherein the actuating section comprises a camming surface which is engageable by an edge of a smart card to urge the actuating section away from the smart card and the contact section toward the smart card.

5. The smart card reader as recited in claim 1 wherein the arm is positioned over the leg such that the actuating section lies on a first side of the leg and the contact section lies on a second side of the leg opposite the first side.

6. The smart card reader as recited in claim 1 wherein the arm extends from the leg in a cantilever fashion such that the arm has a free end.

7. The smart card reader as recited in claim 6 wherein the actuating section is generally C-shaped and is disposed at the free end of the arm such that a first end of the C-shaped actuating section extends from the arm and a second end has a camming surface facing the arm.

8. A smart card reader comprising:

a base being profiled to have a card receiving area and a contact receiving area, a cover being mounted to the base over the card receiving area, and;

a plurality of contacts each having a leg which extends through the base in the contact receiving area, and an arm pivotably extending from the base, the arm consisting of a contact section and an actuating section, whereby a card is slidably receivable into the card receiving area such that it will first engage the actuating sections causing the arms to pivot about the legs to effect an electrical connection between the contact sections and pads on a surface of the card.

9. The smart card reader as recited in claim 8 wherein the contact section is gold plated.

10. The smart card reader as recited in claim 8 wherein the contact section further comprises a gold material deposited thereon by thermo-compression bonding.

11. The smart card reader as recited in claim 8 wherein the arm is positioned over the leg such that the actuating section lies on a first side of the leg and the contact section lies on a second side of the leg opposite the first side.

12. The smart card reader as recited in claim 11 wherein the actuating section comprises a camming surface which is engageable by an edge of a smart card to urge the actuating section away from the smart card and the contact section toward the smart card.

13. The smart card reader as recited in claim 8 wherein the arm extends from the leg in a cantilever fashion such that the arm has a free end.

14. The smart card reader as recited in claim 13 wherein the actuating section is generally C-shaped and is disposed at the free end of the arm such that a first end of the C-shaped actuating section extends from the arm and a second end has a camming surface facing the arm.

* * * * *